United States Patent
Michel

(10) Patent No.: US 9,849,591 B2
(45) Date of Patent: Dec. 26, 2017

(54) LOCALIZATION OF A ROBOT IN AN ENVIRONMENT USING DETECTED EDGES OF A CAMERA IMAGE FROM A CAMERA OF THE ROBOT AND DETECTED EDGES DERIVED FROM A THREE-DIMENSIONAL MODEL OF THE ENVIRONMENT

(71) Applicant: X Development LLC, Mountain View, CA (US)

(72) Inventor: Philipp Michel, Palo Alto, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 126 days.

(21) Appl. No.: 14/873,430

(22) Filed: Oct. 2, 2015

(65) Prior Publication Data
US 2017/0098309 A1    Apr. 6, 2017

(51) Int. Cl.
*B25J 9/16*    (2006.01)
*G05G 9/047*    (2006.01)
(Continued)

(52) U.S. Cl.
CPC ........... *B25J 9/1692* (2013.01); *B25J 9/1697* (2013.01); *G05G 9/04737* (2013.01); *G06T 7/75* (2017.01);
(Continued)

(58) Field of Classification Search
CPC .. G06K 9/6878; G06K 9/6204; G06K 9/6203; G06K 9/00664; G06T 7/251;
(Continued)

(56) References Cited

U.S. PATENT DOCUMENTS 7,650,013 B2    1/2010  Dietsch et al.
2004/0239756 A1  12/2004  Aliaga et al.
(Continued)

FOREIGN PATENT DOCUMENTS

KR    20140099622    8/2014
WO    2014055278    4/2014

OTHER PUBLICATIONS

Chestnutt, Joel, et al. "Locomotion among dynamic obstacles for the honda asimo." Intelligent Robots and Systems, 2007. IROS 2007. IEEE/RSJ International Conference on. IEEE, 2007.*
(Continued)

*Primary Examiner* — Andrew Moyer
*Assistant Examiner* — Narek Zohrabyan
(74) *Attorney, Agent, or Firm* — Middleton Reutlinger

(57) ABSTRACT

Methods, apparatus, systems, and computer-readable media are provided for using a camera of a robot to capture an image of the robot's environment, detecting edges in the image, and localizing the robot based on comparing the detected edges in the image to edges derived from a three-dimensional ("3D") model of the robot's environment from the point of view of an estimated pose of the robot in the environment. In some implementations, the edges are derived based on rendering, from the 3D model of the environment, a model image of the environment from the point of view of the estimated pose—and applying an edge detector to the rendered model image to detect model image edges from the model image.

18 Claims, 4 Drawing Sheets

(51) Int. Cl.
   *G06T 17/05* (2011.01)
   *G06T 19/20* (2011.01)
   *H04N 13/02* (2006.01)
   *G06T 7/73* (2017.01)

(52) U.S. Cl.
   CPC .............. *G06T 17/05* (2013.01); *G06T 19/20* (2013.01); *H04N 13/021* (2013.01); *H04N 13/0282* (2013.01); *G06T 2200/04* (2013.01); *G06T 2207/10028* (2013.01); *G06T 2207/30244* (2013.01); *G06T 2207/30252* (2013.01); *Y10S 901/09* (2013.01)

(58) Field of Classification Search
   CPC ......... G06T 7/246; G06T 7/248; G06T 7/269; G06T 7/254; G06T 2207/10028; G06T 7/70; B25J 9/1676; B25J 9/1697; B60Q 9/005; B60Q 1/525; Y10S 901/00
   USPC ....... 382/106, 103, 153, 154, 190, 218, 216, 382/285, 291; 345/416
   See application file for complete search history.

(56) References Cited

U.S. PATENT DOCUMENTS

| | | | |
|---|---|---|---|
| 2007/0106423 | A1 | 5/2007 | Myeong et al. |
| 2013/0335529 | A1* | 12/2013 | Engedal ................. G06T 7/251 348/46 |
| 2014/0368645 | A1* | 12/2014 | Ahuja ................... G06T 7/0044 348/143 |
| 2015/0197011 | A1 | 7/2015 | Gutmann et al. |
| 2015/0199572 | A1* | 7/2015 | Kim .................... G06K 9/00624 382/103 |
| 2015/0242591 | A1 | 8/2015 | Davey et al. |
| 2016/0239973 | A1* | 8/2016 | Tanaka ................. G06T 11/00 |
| 2017/0070724 | A9* | 3/2017 | Engedal ................. G06T 7/251 |

OTHER PUBLICATIONS

Michel, Philipp, et al. "Motion planning using predicted perceptive capability." International Journal of Humanoid Robotics 6.03 (2009): 435-457.*
Vlassis, et al. (2001). Edge-based features from omnidirectional images for robot localization.
Negenborn, (2003). Robot localization and Kalman filters (Doctoral dissertation, Utrecht University).
Michel, et al. (Dec. 2005). Vision-guided humanoid footstep planning for dynamic environments . . . .
Michel, et al. (Nov. 2003). Real time facial expression recognition in video using support vector machines. In Proceedings of the 5th international conference on Multimodal interfaces (pp. 258-264). ACM.
Michel, et al. (Oct. 2007). GPU-accelerated real-time 3D tracking for humanoid locomotion and stair climbing. In Intelligent Robots and Systems, 2007. IROS 2007. IEEE/RSJ International Conference on (pp. 463-469). IEEE.
Li, J., Long, L., & Zhang, B. (Mar. 2013). Localization of Mobile Robot Based on Least Square Method. In Proceedings of the 2nd International Conference on Computer Science and Electronics Engineering. 4 pages. Atlantis Press.
Michel, et al. (May 2006). Online environment reconstruction for biped navigation. In Robotics and Automation, 2006. ICRA 2006. Proceedings 2006 IEEE International Conference on (pp. 3089-3094). IEEE.
Michel, P., et al. (2004). Motion-based robotic self-recognition. In Intelligent Robots and Systems, 2004.(IROS 2004). Proceedings. 2004 IEEE/RSJ International Conference on (vol. 3, pp. 2763-2768). IEEE.
Stilman, et al. (2005). Augmented reality for robot development and experimentation. Robotics Institute, Carnegie Mellon University, Pittsburgh, PA, Tech. Rep. CMU-RI-TR-05-55, 2(3), 11 pages.
Chestnutt, et al. (May 2006). An intelligent joystick for biped control. In Robotics and Automation, 2006. ICRA 2006. Proceedings 2006 IEEE International Conference on (pp. 860-865). IEEE.
Michalowski, et al. (Sep. 2006). Roillo: Creating a social robot for playrooms. In Proceedings of the 15th IEEE International Symposium on Robot and Human Interactive Communication (RO-MAN 2006) (pp. 587-592).
Michel, et al. (Oct. 2007). Planning for robust execution of humanoid motions using future perceptive capability. In Intelligent Robots and Systems, 2007. IROS 2007. IEEE/RSJ International Conference on (pp. 3223-3228). IEEE.
Michel, P., & El Kaliouby, R. (2005). Facial expression recognition using support vector machines. In The 10th International Conference on Human-Computer Interaction, Crete, Greece. 2 pages.
Michel, P. (2003). Support vector machines in automated emotion classification. Churchill College, June. 95 pages.
Michel, P., et al. (Jun. 2008). GPU-accelerated real-time 3D tracking for humanoid autonomy. In JSME robotics and mechatronics conference. 4 pages.
Kagami, S., et al. (2007). Humanoid HRP2-DHRC for autonomous and interactive behavior. In Robotics Research (pp. 103-117). Springer Berlin Heidelberg.
Michel, et al. (Dec. 2008). Humanoid navigation planning using future perceptive capability. In Humanoid Robots, 2008. Humanoids 2008. 8th IEEE-RAS International Conference on (pp. 507-514). IEEE.
Michel, P. (2008). Integrating perception & planning for humanoid autonomy (Doctoral dissertation, Carnegie Mellon University). 146 pages.
Michel, P. et al. (2007). Locomotion Among Dynamic Obstacles for the Honda ASIMO; International Conference on Intelligent Robots and Systems; San Diego CA.
Michel, P. et al. (2009). Motion Planning Using Predicted Perceptive Capability; International Journal of Humanoid Robotics—http://www.worldscientific.com/doi/abs/10.1142/S0219843609001826.
Cobzas, D., et al.; Merging Panoramic Intensity and Range Maps for Robot Localization; Department of Computing Science—University of Alberta; CA.
Charmette, B., Royer, E., Chausse, F., & Lequievre, L. 2009. Robot Localization Using Efficient Planar Features Matching; Clermont Universities, Institut Pascal; Aubiere.
International Preliminary Report on Patentability for PCT/US2016/054809 dated Jan. 17, 2017.
Taiwan Intellectual Property Office, Office Action for Taiwanese Patent Application No. 105131769, 6 pages Aug. 23, 2017.

* cited by examiner

LOCALIZATION OF A ROBOT IN AN ENVIRONMENT USING DETECTED EDGES OF A CAMERA IMAGE FROM A CAMERA OF THE ROBOT AND DETECTED EDGES DERIVED FROM A THREE-DIMENSIONAL MODEL OF THE ENVIRONMENT

BACKGROUND

Robots may be programmed to perform a variety of tasks such as, for example, autonomous or semi-autonomous navigation, manipulating objects (e.g., repositioning an object, altering an object, and/or picking up an object and moving it to a different location), transporting objects (without necessarily manipulating those objects), monitoring environmental conditions, functioning as "video conferencing on wheels", and so forth.

If a robot does not know where it is, it can be difficult for the robot to perform various tasks with accuracy. Robot localization seeks to resolve the pose (location and orientation) of a robot in an environment, thereby enabling the robot to know where it is. Various robot localization techniques have been proposed. For example, dead reckoning uses sensor readings from one or more odometers of a robot, along with trigonometry and kinematic equations, to determine how a robot has moved and to update the pose of the robot based on the determination. Also, for example, some robot localization techniques utilize active beacons (e.g., infrared, sound) and/or passive beacons (e.g., reflectors) with known locations throughout an environment to enable sensor(s) of a robot to sense those beacons and triangulate or otherwise determine the robot's pose relative to the sensed beacons and, as a result, its pose in the environment. These and/or other robot localization techniques may suffer from one or more drawbacks such as localization accuracy, computational costs, costs associated with placing beacons or other landmarks in the environment, and/or costs associated with sensor(s) necessary to perform the localization techniques. Additional and/or alternative drawbacks of the aforementioned techniques and/or other techniques may be presented.

SUMMARY

The present disclosure is directed to using a camera of a robot to capture an image of the robot's environment, detecting edges in the image, and localizing the robot based on comparing the detected edges in the image to edges derived from a three-dimensional ("3D") model of the robot's environment. As used herein, "localizing a robot" in an environment means determining a pose of the robot in the environment relative to some reference frame, such as a so-called "world frame". As used herein, "pose" references both position and orientation. For example, a determined pose of a robot may define values for six degrees of freedom of the robot.

As one example of robot localization according to techniques described herein, a camera image is captured by a camera of a robot in an environment. An edge detector is applied to the camera image to detect camera image edges in the camera image. The edge detector may employ one or more edge detection techniques such as a Canny edge detection algorithm.

An estimated pose of the robot's camera in the environment is further identified. In some implementations, the estimated pose may be a pose determined using other robot localization techniques (e.g., in a first iteration of robot localization techniques described herein) and/or may be based on a pose of the robot's camera determined during a previous iteration of robot localization techniques described herein.

The estimated pose is used to render, from a three-dimensional model of the environment, a model image of the environment from the point of view of the estimated pose. In other words, the rendered model image is a rendered image of the model with the point of view of the rendered image having the same location and orientation as the estimated pose. In some implementations (e.g., when the camera image is a two-dimensional image), "rendering a model image from a 3D model" means converting a portion of the 3D model into a two-dimensional image of that portion (e.g., an image with one or more color and/or grayscale channels). In some implementations (e.g., when the camera image includes a depth channel and one or more color and/or grayscale channels), "rendering a model image from a 3D model" means converting a portion of the 3D model into a "2.5D" image that includes a depth channel and one or more color and/or grayscale channels. Various rendering techniques may be utilized such as rasterization, ray casting, radiosity, and/or ray tracing.

The edge detector is also applied to the rendered model image to detect model image edges in the model image. A current pose of the camera of the robot (i.e., the pose of the camera when the camera image was captured) is then determined based on comparing the camera image edges to the model image edges. For example, Euclidean distances between one or more of the camera image edges and one or more corresponding model image edges may be determined and those distances utilized to determine the pose. For instance, the direction and/or magnitude of the distances may be utilized to derive the pose of the camera of the robot from the estimated pose that was used to generate the model image. In other words, the current pose of the camera may be determined by modifying the estimated pose in view of the differences between the edges of the camera image (taken by the camera at its actual pose) and the model image (rendered from the point of view of the estimated pose).

The determined current pose of the camera is then used to localize the robot in the environment. For example, in some implementations the robot may be localized by assigning the current pose of the camera as the current pose of the robot (e.g., the current pose of the robot may be the same as the current pose of the camera). Also, for example, in some implementations the pose of the robot may be with respect to a different reference point than the pose of the camera and the relative difference between the pose of the camera and the pose of the robot may be known. In some of those implementations, the robot may be localized by transforming the determined pose of the camera to the pose of the robot using that known relative difference.

In some implementations of determining the current pose of the robot's camera based on comparing one or more of the camera image edges to one or more of the model image edges, one or more additional model images of the environment may be rendered from the 3D model—each with points of view from different candidate poses. The edge detector may be applied to each of the additional model images, and the pose determined based on the candidate pose of the additional model image with one or more edges that satisfy some threshold relative to one or more of the camera image edges. For instance, the candidate pose for the additional model image with the least amount of differences between its edges and the robot image edges may be selected as the pose. In some implementations, the candidate pose(s) used to generate the additional model image(s) may be determined based on the differences between the camera image edges and the model image edges of the model image rendered based on the estimated pose (e.g., one or more most likely candidate pose(s) that are indicated by those differences).

Multiple iterations of the example robot localization described above may be performed, each time using a newly captured image from the robot's camera and using an "estimated pose" that is based on the immediately preceding determined current pose of the camera. In some implementations, the immediately preceding current pose of the robot's camera may be used as the estimated pose. In some other implementations, the estimated pose may be determined based on modifying the immediately preceding current pose of the robot's camera based on sensor data from one or more additional sensors of the robot. For example, sensor data from an inertial measurement unit, one or more odometers, and/or one or more other sensors may be utilized to determine a likely change to the immediately preceding pose. That likely change may applied to the immediately preceding pose and the result utilized as the estimated pose for the next iteration.

In some implementations, a method may be provided that includes capturing a camera image by a camera of a robot in an environment and applying an edge detector to the camera image to detect camera image edges in the camera image. The method further includes identifying an estimated pose of the camera in the environment and rendering, from an electronically stored three-dimensional model of the environment, a model image of the environment from a point of view of the estimated pose. The method further includes applying the edge detector to the model image of the environment to detect model image edges in the model image and determining a current pose of the camera in the environment based on comparing the camera image edges to the model image edges. The method further includes localizing the robot in the environment based on the current pose of the camera.

This method and other implementations of technology disclosed herein may each optionally include one or more of the following features.

In some implementations, the estimated pose of the camera in the environment is based on an immediately preceding pose of the camera. The immediately preceding pose of the camera may be determined based on comparing preceding camera image edges of a preceding camera image captured by the camera to preceding model image edges of a preceding model image rendered from the point of view of a preceding estimated pose. In some of those implementations, the estimated pose of the camera in the environment is determined based on modifying the immediately preceding pose based on sensor data from one or more additional sensors of the robot, such as an inertial measurement unit sensor.

In some implementations, the method further includes: capturing an additional camera image by the camera following the capturing of the camera image; applying the edge detector to the additional camera image to detect additional camera image edges in the additional camera image; determining an additional estimated pose of the camera in the environment based on the determined current pose of the camera in the environment; rendering, from the electronically stored three-dimensional model of the environment, an additional model image of the environment from the point of view of the additional estimated pose; applying the edge detector to the additional model image of the environment to detect additional model image edges in the additional model image; and determining a new current pose of the camera in the environment based on comparing the additional camera image edges to the additional model image edges. In some of those implementations, determining the additional estimated pose based on the determined current pose of the camera in the environment includes defining the additional estimated pose as the determined current pose of the camera in the environment. In some other of those implementations, the method further includes receiving sensor data from one or more additional sensors of the robot and determining the additional estimated pose based on the determined current pose of the camera includes determining the additional estimated pose based on the determined current pose of the camera and based on the sensor data.

In some implementations, determining the current pose of the camera in the environment based on comparing the camera image edges to the model image edges includes determining differences between the camera image edges and the model image edges and determining the current pose of the camera based on the differences.

In some implementations, determining the pose of the camera in the environment based on comparing the camera image edges to the model image edges comprises: determining differences between the camera image edges and the model image edges; determining a candidate pose of the camera based on the differences; rendering, from the electronically stored three-dimensional model of the environment, an additional model image of the environment from the point of view of the candidate pose; applying the edge detector to the additional model image of the environment to extract additional model image edges from the additional model image; determining additional differences between the additional camera image edges and the additional model image edges; and using the candidate pose as the current pose of the camera if the additional differences satisfy a threshold.

In some implementations, the camera image is captured by a single sensor of the camera. In some of those implementations, the camera is a monocular camera.

In some implementations, a graphics processor unit of the robot performs one or more steps of the method.

In some implementations, the three-dimensional model of the environment is a computer aided design model.

In some implementations, the current pose is a six degree of freedom pose.

In some implementations, a method may be provided that includes: capturing a camera image by a camera of a robot in an environment; applying an edge detector to the camera image to detect camera image edges in the camera image; identifying an estimated pose of the camera in the environment; determining, based on an electronically stored three-dimensional model of the environment, model edges of the environment from a point of view of the estimated pose; determining a current pose of the camera in the environment based on comparing the camera image edges to the model edges; and localizing the robot in the environment based on the current pose of the camera.

Other implementations may include at least one non-transitory computer readable storage medium storing instructions executable by a processor to perform a method such as one or more of the methods described above. Yet another implementation may include a robot and/or a computer system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
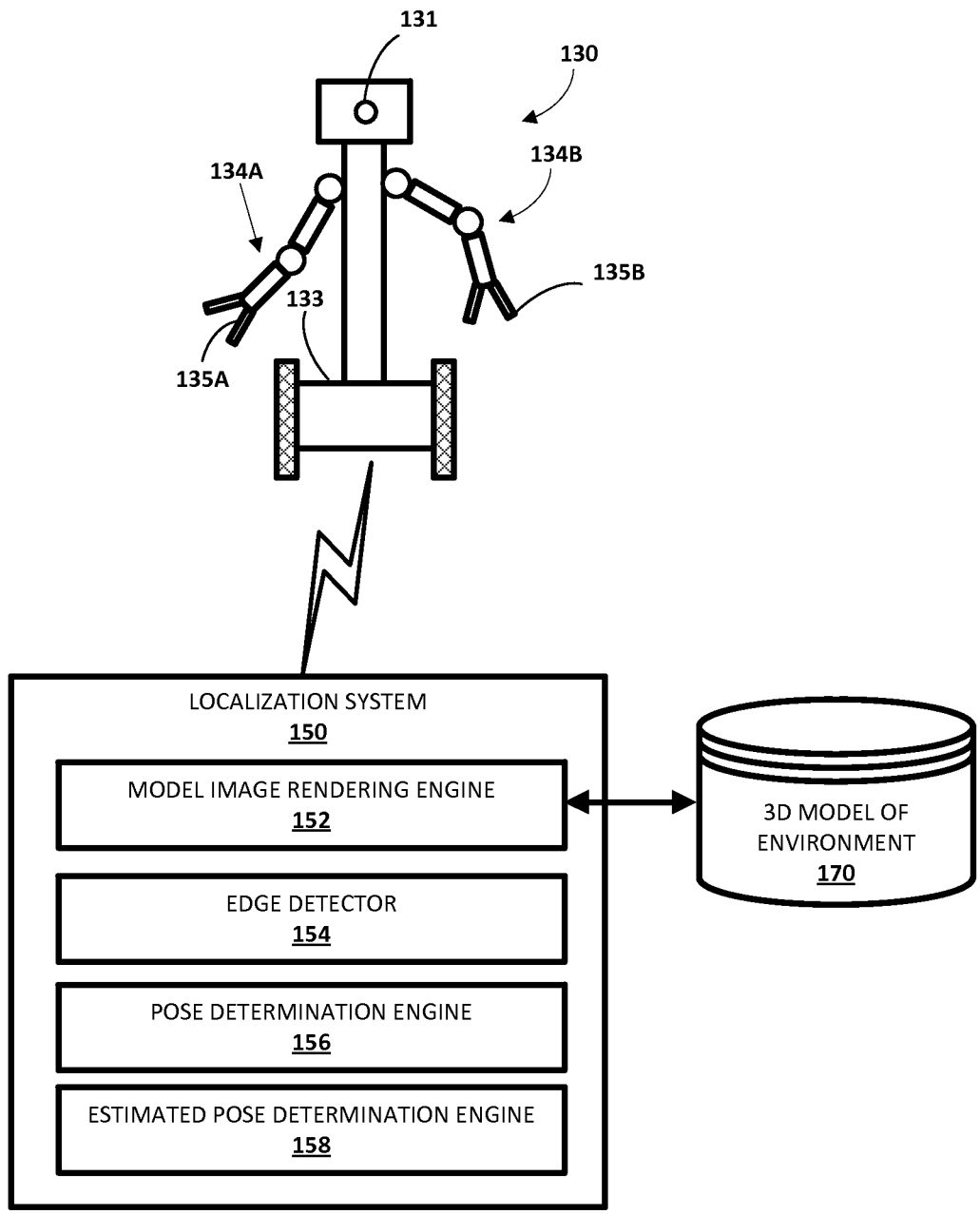
FIG. 1 illustrates an example robot, an example localization system, and an example three-dimensional model of an environment.

FIG. 1 illustrates an example robot 130, an example localization system 150, and an example three-dimensional ("3D") model of an environment 170. The robot 130 is mobile and has access to one or more portions of an indoor environment such as a building (e.g., a warehouse, a manufacturing facility, an office building), one or more buildings of a collection of nearby buildings, one or more floors of a multi-floor office or other building, etc. Additional and/or alternative robots may be provided in the indoor environment, such as additional robots that vary in one or more respects from robot 130 illustrated in FIG. 1. For example, mobile telepresence robots, mobile forklift robots, and/or humanoid robots may be provided as the only robots and/or with other robots in some implementations. One or more provided additional and/or alternative robots may embody a separate instance of localization system 150 described below and/or may be in communication with a localization system 150 (or a separate instance of localization system 150).

Robot 130 includes a base 133 with wheels provided on opposed sides thereof for locomotion of the robot 130. The base 133 may include, for example, one or more motors for driving the wheels of the robot 130 to achieve a desired direction, velocity, and/or acceleration of movement for the robot 130.

Robot 130 also includes a camera 131. In some implementations the camera 131 may be a monocular camera that includes a single sensor (e.g., a charge-coupled device (CCD)), and generates, based on physical properties sensed by the sensor, images that each includes a plurality of data points defining color values and/or grayscale values. For instance, the monocular camera may generate images that include red, blue, and/or green channels. Each channel may define a value for each of a plurality of pixels of the image such as a value from 0 to 255 for each of the pixels of the image. In some implementations, the camera 131 may be a stereographic camera that includes two or more sensors, each at a different vantage point. In some of those implementations, the stereographic camera generates, based on characteristics sensed by the two sensors, images that each includes a plurality of data points defining depth values and color values and/or grayscale values. For example, the stereographic camera may generate images that include a depth channel and red, blue, and/or green channels. In some implementations, the camera 131 may be a stereographic camera, but only one of the sensors may be used to generate images that do not include a depth channel.

Robot 130 also includes one or more processors that, for example, provide control commands to actuators and/or other operational components thereof, localize the robot according to techniques described herein, generate control commands for various tasks based at least in part on a current pose of the robot determined according to techniques described herein, etc. For example, one or more processors of robot 130 may provide control commands to servo motors that drive the wheels of the robot 130 to navigate the robot 130 to various locations in the environment autonomously and/or semi-autonomously. Also, for example, one or more processors of robot 130 may implement all or aspects of localization system 150 and/or perform all or aspects of the method 300 of FIG. 3. Additional description of some examples of the structure and functionality of various robots is provided herein.

The robot 130 also includes robot arms 134A and 134B with corresponding end effectors 135A and 135B that each take the form of a gripper with two opposing "fingers" or "digits." The robot arms 134A, 134B and end effectors 135A, 135B may be controlled autonomously, semi-autonomously, and/or based on control commands provided by a user via a computing device of a user. For example, the robot arm 134B may be autonomously controlled to position the end effector 135B proximal to an object and the end effector 135B may be autonomously controlled to grasp the object. In some of those implementations, the processor(s) of the robot 130 may generate control commands to control robot arm 134B and/or end effector 135B and generating those control commands may be influenced at least in part by a current pose of the robot 130 determined according to techniques described herein.

All or aspects of localization system 150 may be implemented by the robot 130 in some implementations. In some implementations, all or aspects of localization system 150 may be implemented by one or more computing systems that are in communication with the robot 130. Various modules or engines may be implemented as part of localization system 150 as software, hardware, or any combination of the two. For example, in FIG. 1 localization system 150 includes a model image rendering engine 152, an edge detector 154, a pose determination engine 156, and an estimated pose determination engine 158.

The model image rendering engine 152 is configured to render, from the 3D model of the environment 170, a model image of the environment from the point of view of an identified estimated pose of the camera 131 of the robot 130. In other words, the model image rendering engine 152 renders the model image with the point of view of the rendered image having the same location and orientation as the estimated pose. The estimated pose of the camera 131 that is used to render the model image for a given iteration may be an estimated pose determined by estimated pose determination engine 158 for the given iteration. As described herein, in some implementations the estimated pose of the camera 131 may be a pose determined using other robot localization techniques (e.g., in a first iteration of robot localization techniques described herein) and/or may be based on a pose of the camera 131 determined during a previous iteration (e.g., the immediately preceding iteration) of robot localization techniques described herein.

The model image rendering engine 152 may use various rendering techniques to render a model image from the 3D model of the environment 170 such as rasterization, ray casting, radiosity, and/or ray tracing. The particular rendering technique(s) and/or parameters for the rendering technique(s) may optionally be selected in view of various criteria such as computational costs, desired speed (e.g., to enable "real-time" rendering), etc.

The 3D model of the environment 170 defines at least some structures of an environment, the sizes of those structures, and the spatial relationship between those structures. Accordingly, the 3D model of the environment 170 is a measurably accurate model of structures of the environment. The 3D model of the environment 170 may be defined with various levels of detail. For example, in some implementations the 3D model may be a relatively coarse computer-aided design ("CAD") model generated using CAD software. In some of those implementations, the 3D model of the environment 170 may be a 3D architectural design of an indoor environment created as part of the design process of the indoor environment and/or created based on other architectural designs of the indoor environment. In some implementations, the 3D model of the environment 170 may be generated based on sensor data from one or more sensors of one or more robots or other automated agents. For example, the 3D model of the environment 170 may be generated based on "merging" 3D laser scans from one or more 3D laser scanners of one or more robots that have navigated throughout the indoor environment.

In some implementations, the 3D model of the environment 170 may model fixed structures of the indoor environment such as walls, doors, windows, ceilings, and/or floors of the indoor environment and the spatial relationship between those fixed structures (e.g., where a window is in a wall, where a wall meets a ceiling). In some implementations, the 3D model of the environment 170 may further model non-fixed structures such as shelves, furniture, and/or pictures of the indoor environment. In some implementations, one or more fixed structures and/or non-fixed structures of an environment may be omitted from the 3D model of the environment 170. In some implementations, the 3D model of the environment 170 may be defined in a vector graphics format as a plurality of shapes (e.g., polygons), optionally with one or more features of one or more of the shapes defined such as material(s), color(s), etc.

The edge detector 154 is configured to detect one or more edges in images. An edge in an image is a discontinuity in brightness and/or depth (e.g., in the case of a 2.5D image) in the image that satisfies one or more thresholds of the edge detector 154. Discontinuities in an image may correspond to, for example, discontinuities in depth, discontinuities in surface orientation, changes in material properties (e.g., color, texture), and/or variations in illumination. For example, the edge detector 154 may detect edges in images that correspond to two walls meeting, a ceiling meeting a wall, an opening in a wall, a window frame, color variations in a wall, etc.

The edge detector 154 may detect edges in camera images captured by the camera 131 of the robot 130 and may also detect edges in model images generated by model image rendering engine 152. The edge detector 154 may utilize one or more techniques to detect edges in an image. For example, the edge detector may employ one or more edge detection algorithms such as the Canny edge detection algorithm.

The pose determination engine 156 is configured to determine a current pose of the camera 131 based on comparing edges extracted from a camera image of the camera 131 and edges extracted from a model image generated by model image rendering engine 152 from the point of view of the estimated pose of the camera 131 of the robot 130 when the camera image of the camera 131 was captured.

The pose determination engine 156 is further configured to determine a current pose of the robot (i.e., localize the robot) based on the determined current pose of the camera 131. For example, in some implementations the pose determination engine 156 may assign the current pose of the camera 131 as the current pose of the robot. Also, for example, in some implementations the relative difference between the pose of the camera 131 and the pose of the robot may be known, and the pose determination engine 156 may transform the pose of the camera 131 to the pose of the robot using that known relative difference. In some of those implementations, the camera 131 may be statically mounted on the robot 130, the relative difference between the pose of the camera 131 and the pose of the robot may be static, and the pose of the camera 131 may be transformed to the pose of the robot using a fixed transformation. In some other implementations, the camera 131 may be dynamically coupled to the robot 130 (e.g., on an actuable arm or other component), the relative difference between the pose of the camera 131 and the pose of the robot may be "known" based on applying robot kinematics to determine the current relative difference, and a current transformation to the pose of the robot determined based on the current relative difference.

In some implementations, the pose determination engine 156 may determine one or more Euclidean distances between one or more of the camera image edges and one or more matching edges of the model image and use those distances to determine the current pose of the camera 131. For example, the direction and/or magnitude of the distances may be utilized to derive the current pose from the estimated pose that was used to generate the model image. In other words, the current pose may be determined by modifying the estimated pose in view of the direction and/or magnitude of the distances between the edges of the camera image (taken by the camera at the camera's pose) and the model image (rendered from the estimated pose). In some implementations, the pose determination engine 156 may apply least squares fitting to the determined Euclidean distances. In some of those implementations, the pose determination engine 156 may determine the current pose of the camera based on modifying the estimated pose by the sum of the squares of the differences determined by the least squares fitting. In some implementations of determining one or more Euclidean distances between a given camera image edge and a matching model image edge, multiple Euclidean distances are determined by taking measurements at multiple points along those edges.

As one example, assume that the pose determination engine 156 determines there are no (or nominal) differences between camera image edges and matching model edges. In such an example, the pose determination engine 156 may determine the current pose of the camera is the same as the estimated pose used to render the model image. As another example, assume that the pose determination engine 156 determines relatively small differences between camera image edges and matching model edges. In such an example, the pose determination engine 156 may determine that current pose of the camera based on modifying the estimated pose used to render the model image by an amount and direction that is based on those relatively small differences.

In some implementations, the pose determination engine 156 determines a model edge in the model image matches a camera edge in the camera image based on one or more differences between the model edge and the camera edge satisfying a threshold. The threshold may be, for example, a threshold percentage of the pixels of the model edge are within a threshold number of pixels of the pixels of the camera edge and/or a least means square distance between the two edges is less than a threshold number of pixels. In some implementations, the pose determination engine 156 may filter or otherwise ignore camera edges that it determines do not "match" any model edge (e.g., are greater than a threshold number of pixels from any model edge). For example, if a chair or other object is present in the camera image, but is not modeled in the 3D model of the environment 170, camera edge(s) corresponding to the chair may not match any model edges—and the pose determination engine 156 may filter the edge(s) corresponding to the chair.

In some implementations of determining a given current pose of a camera, the model image rendering engine 152 may render one or more additional model images of the environment from the 3D model of the environment 170—each with points of view from different candidate poses. The edge detector 154 may detect edges in each of the additional model images, and the pose determination engine 156 may determine the current pose of the camera 131 based on the candidate pose of the model image whose edges satisfy some threshold relative to matching camera image edges. For instance, the candidate pose for the model image with the least amount of differences between its edges and the robot image edges may be selected as the current pose. In some implementations, the pose determination engine 156 may determine the candidate pose(s) used to generate the additional model image(s) based on the differences between the camera image edges and the original model image edges from the point of view of the estimated pose. For example, in some implementations the engine 156 may determine a candidate pose of the camera 131 based on the differences, and provide that candidate pose to model image rendering engine 152 to render an additional model image from that candidate pose. The edge detector 154 may detect model edges for the additional model image and the pose determination engine 156 may compare those model edges to the camera edges as a "check" to ensure the current pose of the camera should be determined based on the candidate pose (e.g., to ensure there is a sufficiently close match between those model edges and the camera edges) and/or to generate further candidate pose(s) that can be used to generate yet further additional images that can be used to further refine the current pose of the camera.

The estimated pose determination engine 158 is configured to provide an estimated pose of the camera 131 to the model image rendering engine 152 to enable the model image rendering engine 152 to render a model image from the point of view of that estimated pose. In some implementations, the estimated pose may be based on a current pose of the camera 131 determined during a previous iteration of the proposed robot localization technique. For example, when the proposed robot localization technique iterates at a relatively high frequency (e.g., 30 Hz, or 60 Hz), with each iteration being based on a new camera image from the camera 131, the determined pose of the camera 131 during the immediately preceding iteration of the proposed robot localization technique may provide a fairly close estimate of the actual pose of the camera 131.

In some implementations, the estimated pose determination engine 158 may use the immediately preceding pose of the camera 131 as the estimated pose. In some other implementations, the estimated pose determination engine 158 may determine the estimated pose based on modifying the immediately preceding pose of the camera 131 based on sensor data from one or more additional sensors of the robot 130. For example, sensor data from an inertial measurement unit, one or more odometers, and/or one or more other sensors may be utilized to determine a likely change to the immediately preceding pose of the camera 131. That likely change may applied to the immediately preceding pose and the result utilized as the estimated pose for the next iteration.

In some implementations, the estimated pose determination engine 158 may use other localization techniques to determine the estimated pose. For example, when the robot 130 is moved unexpectedly (e.g., by a human), is initially "powered up" (e.g., after a "hibernation" period or after running out of battery power), and/or otherwise initially unaware of its pose in an environment, the engine 158 may use other localization techniques to determine an estimated pose for an initial iteration of the localization technique described herein.

While robot 130, localization system 150, and 3D model of the environment 170 are depicted separately in FIG. 1, this is not meant to be limiting. In various implementations, one or more aspects of localization system 150 and/or 3D model of the environment 170 may be implemented on the robot 130. For example, all or aspects of one or more of the engines 152, 154, 156, and/or 158 may be implemented via hardware (e.g., processor(s)) of the robot 130. Also, for example, all or aspects of the 3D model of the environment 170 may be stored in memory of the robot 130. In implementations where the robot 130 and one or more aspects of system 150 are separate components, they may communicate over one or more wired or wireless networks or using other wireless technology, such as radio, Bluetooth, infrared, etc. In implementations where one or more aspects of the 3D model of the environment 170 are separate from robot 130, robot 130 may access 3D model of the environment 170 using one or more wired or wireless networks or using other wireless technology. For example, robot 130 may periodically access a remotely stored 3D model of the environment 170 to retrieve and locally store (e.g., buffer) one or more portions of the 3D model of the environment 170 that are within a threshold distance of a current pose of the robot.

Figure 2:
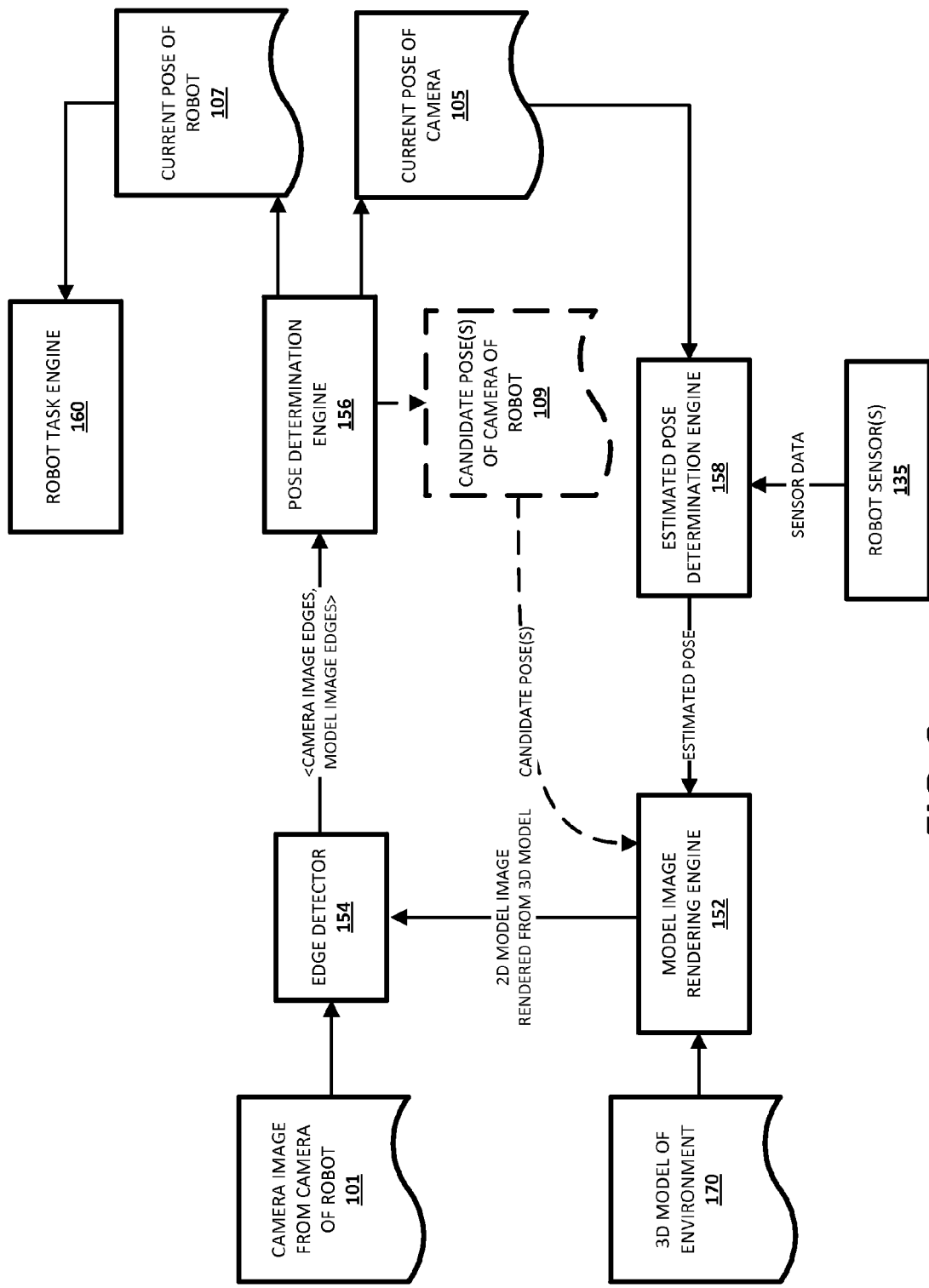
FIG. 2 illustrates an example of detecting edges in an image captured by a camera of a robot, and localizing the robot based on comparing the detected edges in the image to edges derived from a three-dimensional model of the robot's environment.

FIG. 2 illustrates an example of detecting edges in a camera image 101 captured by a camera of a robot (e.g., robot 130 of FIG. 1), and localizing the robot based on comparing the detected edges in the image to edges derived from a 3D model of the environment 170.

In FIG. 2, the model image rendering engine 152 uses the 3D model of an environment 170 to render a 2D model image. The model image rendering engine 152 renders the image from the point of view of an estimated pose of the camera of the robot that is provided by estimated pose determination engine 158. As described herein, the estimated pose may be based on the camera pose of a previous iteration of localizing the robot based on the example of FIG. 2. For example, the current pose of the camera 105 of the immediately preceding iteration may be used as the estimated pose. Also, for example, the estimated pose determination engine 158 may modify the current pose of the camera 105 of the immediately preceding iteration in view of sensor data from one or more additional robot sensors 135 and use such modification as the estimated pose. In some implementations, the estimated pose determination engine 158 may use sensor data from one or more additional robot sensors 135 independent of the current camera pose from a preceding iteration to generate an estimated pose (e.g., in an initial iteration of the example of FIG. 2).

The edge detector 154 receives the 2D model image from the model image rendering engine 152 and also receives the camera image 101 from a camera of a robot. The edge detector 154 extracts camera image edges from the camera image 101, extracts model image edges from the model image, and provides the camera image edges and the model image edges to the pose determination engine 156.

The pose determination engine 156 determines a current pose of the camera 105 of the robot based on comparing the camera image edges to the model image edges as described herein. The pose determination engine 156 further determines a current pose of the robot 107 based on the current pose of the camera 105. For example, the pose determination engine 156 may use the current pose of the camera 105 as the current pose of the robot 107 or may transform the current pose of the camera 105 to the current pose of the robot 107 based on a transformation that takes into account the relative pose difference between the robot and the camera of the robot.

In some implementations, the pose determination engine 156 may optionally determine one or more candidate poses of the camera of the robot 109 (e.g., as described above), and provide those candidate poses 109 to the model image rendering engine 152. In those implementations, the engine 152 may generate one or more additional 2D model images from the 3D model of the environment 170, with each additional 2D model image being from the point of view of a corresponding candidate pose. The edge detector 154 may detect edges in the additional model images and the pose determination engine 156 may determine the current pose of the camera 105 and the current pose of the robot 107 based on the candidate pose of the additional model image whose edges satisfy some threshold relative to the camera image edges.

The current pose of the robot 107 may be provided to robot task engine 160 of the robot and/or to another component of the robot for use in performing one or more robot tasks. For example, the robot task engine 160 may use the current pose of the robot 107 in generating one or more control commands to provide to actuators of the robot in performing a task. The current pose of the camera 105 may be provided to the estimated pose determination engine 158 and the engine 158 may use the current pose of the camera 105 for determining an estimated pose for a next iteration of the example of FIG. 2.

Multiple iterations of the example of FIG. 2 above may be performed, each time using a newly captured camera image 101 from the robot's camera and using an "estimated pose" that is determined by engine 158 based on the immediately preceding determined current pose of the camera 105. For example, the camera of the robot may capture multiple images every second (e.g., 30 frames per second or 60 frames per second) and the current pose of the camera 105 updated according to the example of FIG. 2 each time that a new image is received. Moreover, each time that the current pose of the camera is updated, it may be updated in view of an estimated pose that is determined by engine 158 in view of the immediately preceding current pose of the camera. In some implementations, the example in FIG. 2 may be performed in real-time. For example, the current pose of the robot may be determined based on a most recently captured image of the robot camera prior to a new image being captured by the robot camera.

Figure 3:
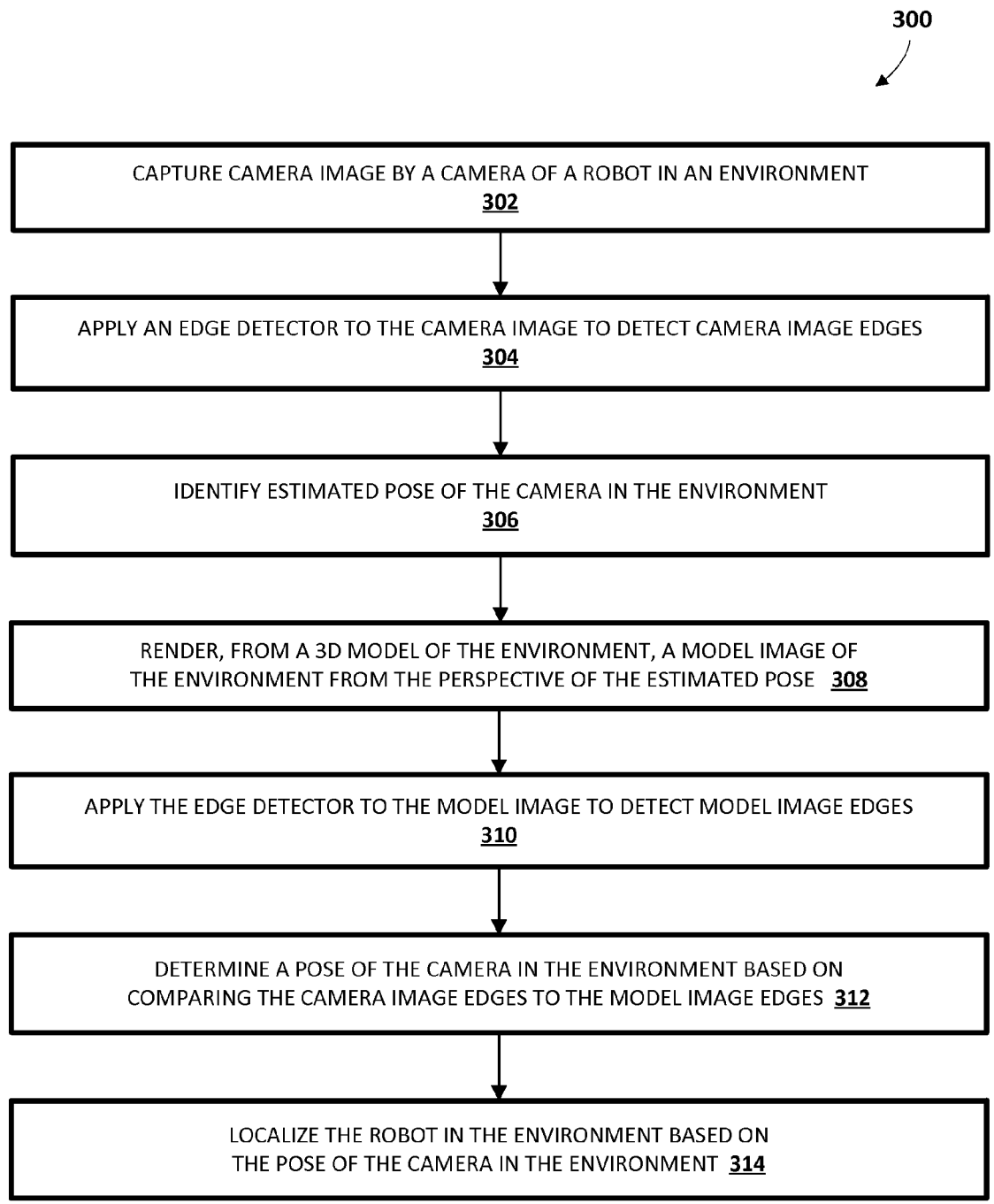
FIG. 3 illustrates an example method, in accordance with various implementations.

FIG. 3 depicts a flow chart illustrating an example method 300 of determining a pose of a camera of a robot in an environment, in accordance with various implementations. For convenience, the operations of the flow chart are described with reference to a system that performs the operations. This system may include various components of various computer systems and/or robots, such as localization system 150 of FIG. 1, camera 131 of FIG. 1, and/or processor(s) 402 of FIG. 4. Moreover, while operations of method 300 are shown in a particular order, this is not meant to be limiting. One or more operations may be reordered, omitted or added.

At block 302, an image is captured by a camera of a robot in an environment. For example, the image may be captured by a monocular camera of the robot.

At block 304, the system applies an edge detector to the camera image to detect camera image edges in the camera image. The system may utilize one or more techniques to detect edges in an image such as Canny edge detection techniques.

At block 306, the system identifies an estimated pose of the camera in the environment. In some implementations, the system may determine the estimated pose based on the pose of the camera determined in block 312 of a previous iteration of the method 300. For example, the current camera pose of the immediately preceding iteration may be used as the estimated pose. Also, for example, the system may modify the current camera pose of the immediately preceding iteration in view of sensor data from one or more additional robot sensors. In some implementations, the system may use sensor data from one or more additional robot sensors independent of the current camera pose from a preceding iteration to generate an estimated pose (e.g., in an initial iteration of the method 300).

At block 308, the system renders, from a 3D model of the environment, a model image of the environment from the point of view of the estimated pose. In other words, the system renders the model image with the point of view of the rendered image having the same location and orientation as the estimated pose. The system may use various rendering techniques to render a model image from the 3D model of the environment such as rasterization, ray casting, radiosity, and/or ray tracing.

At block 310, the system applies the edge detector to the model image to detect model image edges in the model image.

At block 312, the system determines a pose of the camera in the environment based on comparing the camera image edges to the model image edges. For example, the system may determine the Euclidean distances between one or more of the camera image edges of block 304 and one or more matching model image edges of block 310 and use those distances to determine the current pose of the camera. For example, the system may use the direction and/or magnitude of the distances to derive the current pose from the estimated pose that was used to generate the model image at block 308. In some implementations, the system may render one or more additional model images of the environment from the 3D model of the environment—each with points of view from different candidate poses. The system may detect edges in each of the additional model images, and the system may determine the current pose of the camera based on the candidate pose of the model image whose edges satisfy some threshold relative to matching camera image edges.

At block 314, the system localizes the robot in the environment based on the pose of the camera in the environment determined at block 312. For example, the system may localize the robot by assigning the current pose of the camera of block 312 as the current pose of the robot (e.g., the current pose of the robot may be the same as the current pose of the camera). Also, for example, in some implementations the pose of the robot may be with respect to a different reference point than the pose of the camera and the relative difference between the pose of the camera and the pose of the robot may be known. In some of those implementations, the system may localize the robot by transforming the determined pose of the camera to the pose of the robot using that known relative difference.

In some implementations, blocks 302, 304, 306, 308, 310, and/or 312 may also be performed for an additional image captured by an additional camera of the robot (e.g., an additional camera facing a different direction than the camera or otherwise having a different field of view than the camera), and the system may localize the robot at block 314 based on a pose determined at block 312 based on the additional image (of the additional camera) and/or based on a pose determined at block 314 based on the image (of the camera).

For example, each of blocks 302, 304, 306, 308, 310, and 312 may be performed for a first image captured by a first camera of the robot and each of blocks 302, 304, 306, 308, 310, and 312 may also be performed for a second image captured by a second camera of the robot at a time that is proximal (e.g., within 500 milliseconds) to a time that the first image was captured. In such an example, at block 314 the system may localize the robot based on the pose determined at block 312 for the first image and/or the pose determined at block 312 for the second image. For instance, the system may localize the robot based on just one of the poses determined at block 312, such as the pose determined based on the greatest quantity of matching edges (between the corresponding camera image edges and corresponding model image edges) and/or the pose that meets some additional or alternative criterion. Also, for instance, the system may localize the robot based on an average of other combination of both the pose determined at block 312 for the first image and the pose determined at block 312 for the second image. Some implementations that localize the robot taking into account multiple images from multiple cameras may result in improved robot localization in some scenarios, such as when one of the cameras captures an image with no or few edges (e.g., a white wall) but another of the cameras captures an image that includes a greater quantity of edges.

Figure 4:
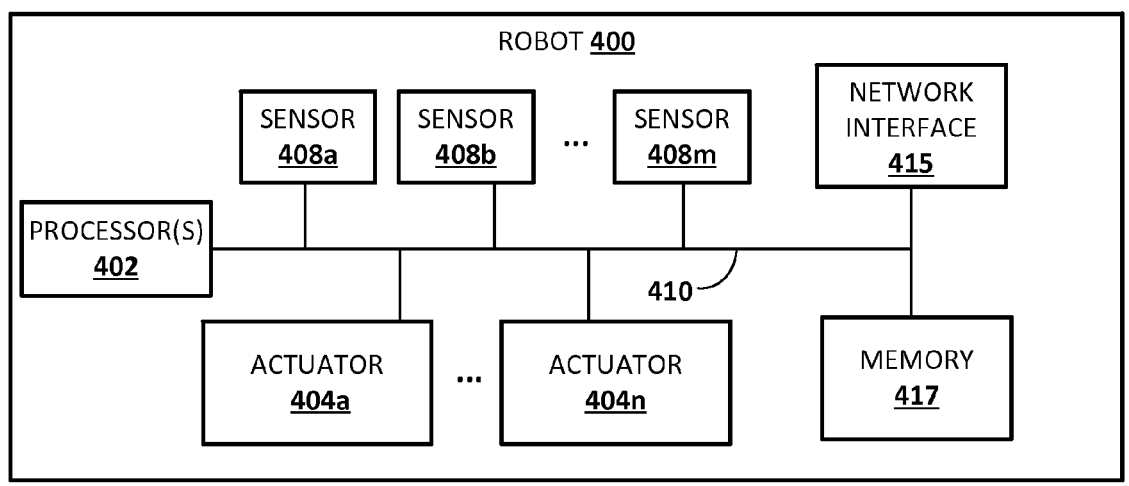
FIG. 4 schematically illustrates an example architecture of a robot.

FIG. 4 schematically depicts an example architecture of a robot. Robot 400 may take various forms, including but not limited to a telepresence robot, a humanoid form, an animal form, a wheeled device, a submersible vehicle, an unmanned aerial vehicle ("UAV"), and so forth. In various implementations, robot 400 may include a processor(s) 402. Processor(s) 402 may take various forms, such as one or more central processing units, one or more graphics processor units ("GPUs"), one or more field-programmable gate arrays ("FPGA"), one or more application-specific integrated circuits ("ASIC"), one or more so-called "real time controllers," and so forth.

In various implementations, processor(s) 402 may be operably coupled with one or more actuators 404a-n and/or one or more sensors 408a-m, e.g., via one or more buses 410. Sensors 408a-m may take various forms, including but not limited to cameras, depth sensors, pressure sensors, pressure wave sensors (e.g., microphones), proximity sensors, accelerometers, gyroscopes, thermometers, barometers, and so forth. While sensors 408a-m are depicted as being integral with robot 400, this is not meant to be limiting. In some implementations, one or more sensors 408a-m may be located external to robot 400, e.g., as standalone units.

Processor(s) 402 may provide control commands to the actuators 404a-n to accomplish one or more tasks. Those control commands include commands that direct the actuators 404a-n to drive wheels and/or other components to enable the robot 400 to traverse one or more paths autonomously, semi-autonomously, and/or in response to control commands provided by a computing device in response to user interface input at the computing device. Processor(s) 402 may generate one or more control commands based at least in part on a pose of the robot determined according to techniques described herein.

Moreover, in some implementations processor(s) 402 may implement one or more (e.g., all) aspects of localization system 150. In some implementations, processor(s) include at least one GPU that implements one or more (e.g., all) aspects of localization system 150. Processor(s) 402 are in communication with memory 417. In some implementations, memory 417 stores all or aspects of a 3D model of an environment and processor(s) 402 may render model images from the 3D model stored in the memory 417. Memory 417 may include, for example, random access memory (RAM) for storage of instructions and data during program execution and/or a read only memory (ROM) in which fixed instructions and/or data are stored.

Network interface subsystem 415 provides an interface to outside networks and is coupled to one or more corresponding interface devices in one or more other computer systems such as a computing device including all or portions of a 3D model of an environment and/or a computing device implementing one or more aspects of localization system 150.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
capturing a camera image by a camera of a robot in an environment;
applying, by one or more processors of the robot, an edge detector to the camera image to detect camera image edges in the camera image;
identifying, by one or more of the processors, an estimated pose of the camera in the environment;
rendering, by one or more of the processors and from an electronically stored three-dimensional model of the environment, a model image of the environment from a point of view of the estimated pose;

applying, by one or more of the processors, the edge detector to the model image of the environment to detect model image edges in the model image;

determining, by one or more of the processors, a current pose of the camera in the environment based on comparing the camera image edges to the model image edges; and localizing, by one or more of the processors, the robot in the environment based on the current pose of the camera;

wherein determining the current pose of the camera in the environment based on comparing the camera image edges to the model image edges comprises:

determining differences between the camera image edges and the model image edges;

determining a candidate pose of the camera based on the differences;

rendering, from the electronically stored three-dimensional model of the environment, an additional model image of the environment from the point of view of the candidate pose;

applying the edge detector to the additional model image of the environment to detect additional model image edges in the additional model image;

determining additional differences between the camera image edges and the additional model image edges; and using the candidate pose as the current pose of the camera if the additional differences satisfy a threshold.

2. The method of claim 1, wherein the estimated pose of the camera in the environment is based on an immediately preceding pose of the camera, wherein the immediately preceding pose of the camera is determined based on comparing preceding camera image edges of a preceding camera image captured by the camera to preceding model image edges of a preceding model image rendered from the point of view of a preceding estimated pose.

3. The method of claim 2, wherein the estimated pose of the camera in the environment is determined based on modifying the immediately preceding pose based on sensor data from one or more additional sensors of the robot.

4. The method of claim 3, wherein the one or more additional sensors include an inertial measurement unit.

5. The method of claim 1, further comprising:
capturing an additional camera image by the camera following the capturing of the camera image;
applying, by one or more of the processors, the edge detector to the additional camera image to detect additional camera image edges in the additional camera image;
determining an additional estimated pose of the camera in the environment based on the determined current pose of the camera in the environment;
rendering, by one or more of the processors and from the electronically stored three-dimensional model of the environment, a further model image of the environment from the point of view of the additional estimated pose;
applying, by one or more of the processors, the edge detector to the further model image of the environment to detect further model image edges in the further model image; and
determining, by one or more of the processors, a new current pose of the camera in the environment based on comparing the additional camera image edges to the further model image edges.

6. The method of claim 5, wherein determining the additional estimated pose based on the determined current pose of the camera in the environment includes defining the additional estimated pose as the determined current pose of the camera in the environment.

7. The method of claim 5, further comprising:
receiving sensor data from one or more additional sensors of the robot;
wherein determining the additional estimated pose based on the determined current pose of the camera includes determining the additional estimated pose based on the determined current pose of the camera and based on the sensor data.

8. The method of claim 1, wherein the camera image is captured by a single sensor of the camera.

9. The method of claim 8, wherein the camera is a monocular camera.

10. The method of claim 1, wherein the one or more processors include a graphics processor unit.

11. The method of claim 1, wherein the three-dimensional model of the environment is a computer aided design model.

12. The method of claim 1, wherein the current pose is a six degree of freedom pose.

13. A robot comprising:
at least one non-transitory computer readable storage medium storing a three-dimensional model of an environment;
a camera;
one or more processors in communication with the non-transitory computer readable storage medium and receiving camera images captured by the camera, wherein the one or more processors are configured to:
apply an edge detector to a camera image of the camera images to detect camera image edges in the camera image;
identify an estimated pose of the camera in the environment;
render, from the three-dimensional model of the environment, a model image of the environment from a point of view of the estimated pose;
apply the edge detector to the model image of the environment to detect model image edges in the model image;
determine a current pose of the camera in the environment based on comparing the camera image edges to the model image edges; and
localize the robot in the environment based on the current pose of the camera
wherein in determining the current pose of the camera in the environment based on comparing the camera image edges to the model image edges one or more of the processors are configured to:
determine differences between the camera image edges and the model image edges;
determine a candidate pose of the camera based on the differences;
render, from the three-dimensional model of the environment, an additional model image of the environment from the point of view of the candidate pose;
apply the edge detector to the additional model image of the environment to detect additional model image edges in the additional model image;
determine additional differences between the camera image edges and the additional model image edges; and use the candidate pose as the current pose of the camera if the additional differences satisfy a threshold.

14. The robot of claim 13, wherein the estimated pose of the camera in the environment is based on an immediately preceding pose of the camera, wherein the immediately preceding pose is determined based on comparing preceding camera image edges of a preceding camera image captured by the camera to preceding model image edges of a preceding model image rendered from the point of view of a preceding estimated pose.

15. The robot of claim 14, wherein the estimated pose of the camera in the environment is determined based on modifying the immediately preceding pose based on sensor data from one or more additional sensors of the robot.

16. The robot of claim 13, wherein the one or more processors are further configured to:
apply the edge detector to an additional camera image of the images captured following the capturing of the image to detect additional camera image edges from the additional camera image;
determine an additional estimated pose of the camera in the environment based on the determined current pose of the camera in the environment;
render, from the three-dimensional model of the environment, a further model image of the environment from the point of view of the additional estimated pose;
apply the edge detector to the further model image of the environment to extract further model image edges from the further model image; and
determine a new pose of the camera in the environment based on comparing the additional camera image edges to the further model image edges.

17. The robot of claim 13, wherein the camera is a monocular camera.

18. A method, comprising:
capturing a camera image by a camera of a robot in an environment;
applying, by one or more processors of the robot, an edge detector to the camera image to detect camera image edges in the camera image;
identifying, by one or more of the processors, an estimated pose of the camera in the environment;
determining, by one or more of the processors based on an electronically stored three-dimensional model of the environment, model edges of the environment from a point of view of the estimated pose, the three-dimensional model of the environment defining multiple structures of the environment, and the spatial relationship between the structures;
determining, by one or more of the processors, a current pose of the camera in the environment based on comparing the camera image edges to the model edges; and
localizing, by one of more of the processors, the robot in the environment based on the current pose of the camera;
wherein determining the current pose of the camera in the environment based on comparing the camera image edges to the model image edges comprises:
determining a candidate pose of the camera based on differences between the camera image edges and the model image edges;
rendering, from the electronically stored three-dimensional model of the environment, an additional model image of the environment from the point of view of the candidate pose;
applying the edge detector to the additional model image of the environment to detect additional model image edges in the additional model image;
determining additional differences between the camera image edges and the additional model image edges; and
using the candidate pose as the current pose of the camera based on the additional differences.

* * * * *